(12) United States Patent
Kelly et al.

(10) Patent No.: US 9,499,378 B2
(45) Date of Patent: Nov. 22, 2016

(54) PROCESS AND STRUCTURE FOR SERVICING A VEHICLE

(71) Applicants: Jim Kelly, Chesterfield Twp., MI (US); Denise C. Kelly, Chesterfield Twp., MI (US)

(72) Inventors: Jim Kelly, Chesterfield Twp., MI (US); Denise C. Kelly, Chesterfield Twp., MI (US)

(*) Notice: Subject to any disclaimer, the term of this patent is extended or adjusted under 35 U.S.C. 154(b) by 122 days.

(21) Appl. No.: 14/641,800

(22) Filed: Mar. 9, 2015

(65) Prior Publication Data

US 2015/0251884 A1   Sep. 10, 2015

Related U.S. Application Data

(60) Provisional application No. 61/950,244, filed on Mar. 10, 2014.

(51) Int. Cl.
| | | |
|---|---|---|
| *F16C 3/14* | (2006.01) | |
| *F16N 33/00* | (2006.01) | |
| *B67C 3/02* | (2006.01) | |
| *B65B 1/04* | (2006.01) | |
| *B65B 3/04* | (2006.01) | |
| *B60P 1/48* | (2006.01) | |
| *B66F 7/10* | (2006.01) | |
| *B62B 3/00* | (2006.01) | |
| *B66F 3/46* | (2006.01) | |
| *F01M 11/04* | (2006.01) | |

(52) U.S. Cl.
CPC . *B66F 7/10* (2013.01); *B62B 3/00* (2013.01); *B66F 3/46* (2013.01); *F01M 11/0458* (2013.01)

(58) Field of Classification Search
CPC ........ B25H 1/0014; B25H 3/00; B66F 7/08; B66F 7/0641; B66F 7/28
USPC .............................. 184/1.5; 141/98; 254/8 B
See application file for complete search history.

(56) References Cited

U.S. PATENT DOCUMENTS

| | | | | |
|---|---|---|---|---|
| 1,664,373 A | | 12/1927 | Fagan | |
| 1,689,144 A | * | 10/1928 | Lunati | B66F 7/18 104/44 |
| 1,814,049 A | * | 7/1931 | Martin | B66F 7/12 184/1.5 |
| 2,385,393 A | * | 9/1945 | Wilson | B60S 3/00 134/104.4 |
| 3,788,414 A | * | 1/1974 | Netter | B60S 13/00 187/203 |
| 4,077,607 A | * | 3/1978 | Lovelady | B62H 3/08 211/17 |
| 4,188,985 A | * | 2/1980 | Osterman | E04H 5/06 137/234.6 |
| 4,324,384 A | * | 4/1982 | Elser | B25H 1/0014 254/131 |
| 4,460,158 A | * | 7/1984 | Chiesa | B25H 1/0007 254/124 |
| 4,531,712 A | * | 7/1985 | Christian | B25H 1/0014 254/88 |
| 4,662,020 A | | 5/1987 | Wilkerson | |
| 4,724,875 A | * | 2/1988 | Baldwin | B60P 3/14 137/234.6 |
| 4,762,155 A | * | 8/1988 | Gruber | F16N 31/002 141/10 |
| 4,789,047 A | | 12/1988 | Knobloch | |
| 4,796,537 A | | 1/1989 | Besser | |
| 4,987,973 A | * | 1/1991 | Cody | F16N 31/002 184/1.5 |

(Continued)

*Primary Examiner* — Henry Liu
(74) *Attorney, Agent, or Firm* — Dinsmore & Shohl LLP; Mark A. Harper

(57) ABSTRACT

A support and a process for a non-automotive vehicle to be lifted by a car lift and allow for servicing of the vehicle. The support can include a support surface that has an engine access opening and a rolling mechanism attached to the support surface that affords for the support surface to roll into a service area that has a car lift. The car lift can be a two-post car and the support spans the distance between lift arms of the car lift. Once the support with a vehicle thereon is lifted above a service area floor vehicle, the engine of the vehicle can be serviced through the engine access opening. In this manner, non-automotive vehicles can be easily and quickly serviced in traditional automotive service areas, shops, etc.

15 Claims, 5 Drawing Sheets

(56) References Cited

U.S. PATENT DOCUMENTS

| | | | | |
|---|---|---|---|---|
| 5,074,379 A | * | 12/1991 | Batrice | F01M 11/0408 123/196 R |
| 5,833,294 A | | 11/1998 | Williams et al. | |
| 6,092,787 A | | 7/2000 | Nayman | |
| 6,095,746 A | * | 8/2000 | Bergin | B62B 5/0083 269/17 |
| 6,102,370 A | | 8/2000 | Johnston | |
| 6,173,941 B1 | | 1/2001 | Johnston | |
| 6,199,826 B1 | * | 3/2001 | Nix | B60P 3/07 254/1 |
| 6,345,693 B1 | | 2/2002 | Yeo et al. | |
| 6,467,746 B1 | * | 10/2002 | Paskiewicz | B60S 13/02 104/44 |
| 6,651,778 B1 | * | 11/2003 | Manning | F01M 11/0458 184/1.5 |
| 6,772,997 B2 | * | 8/2004 | Keaton | B60P 1/4421 254/90 |
| 6,935,619 B2 | * | 8/2005 | Chamoun | B66F 3/08 254/10 B |
| 7,033,119 B2 | * | 4/2006 | Baker | B60P 3/122 410/30 |
| 7,066,448 B2 | * | 6/2006 | Thurm | B62H 3/10 254/124 |
| 7,195,106 B2 | * | 3/2007 | Heynssens | B60P 1/4442 187/244 |
| 7,213,621 B1 | * | 5/2007 | Chang | F16N 31/00 141/297 |
| 7,771,155 B2 | * | 8/2010 | Thiel | B25H 1/0014 187/214 |
| 7,874,057 B1 | * | 1/2011 | Rickards | B25H 5/00 29/430 |
| 8,869,943 B2 | * | 10/2014 | Matthews | B66F 7/28 187/204 |
| 2003/0089896 A1 | * | 5/2003 | Reinikka | B25H 1/0014 254/134 |
| 2005/0077505 A1 | * | 4/2005 | Thurm | B62H 3/10 254/89 H |
| 2006/0182564 A1 | * | 8/2006 | Thiel | B25H 1/0014 414/427 |
| 2008/0156589 A1 | * | 7/2008 | Marchand | B66F 7/065 187/219 |
| 2009/0038889 A1 | * | 2/2009 | Whitney | B66F 7/24 187/210 |
| 2009/0196721 A1 | * | 8/2009 | Thiel | B25H 1/0014 414/427 |
| 2010/0207085 A1 | * | 8/2010 | Thurm | B66F 7/0641 254/2 C |
| 2011/0000745 A1 | * | 1/2011 | Good | B60S 3/041 187/215 |
| 2011/0155980 A1 | * | 6/2011 | Thurm | B66F 7/0675 254/93 L |
| 2012/0090921 A1 | * | 4/2012 | Janz | B66F 7/28 187/216 |

* cited by examiner

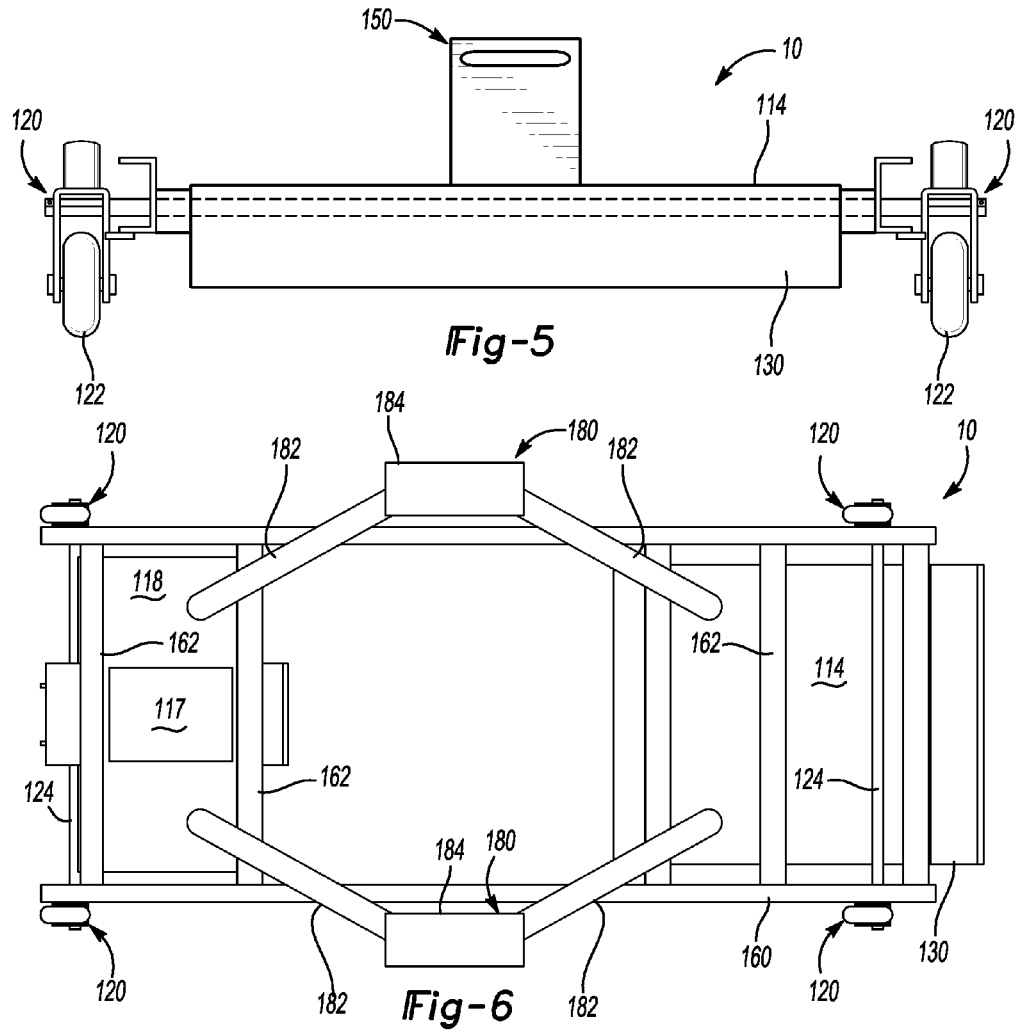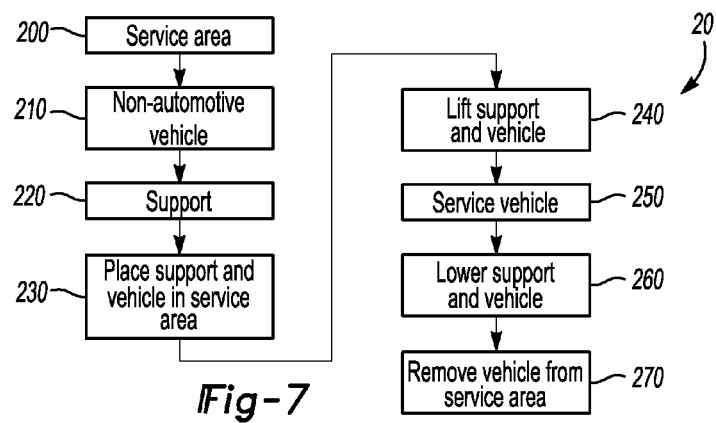

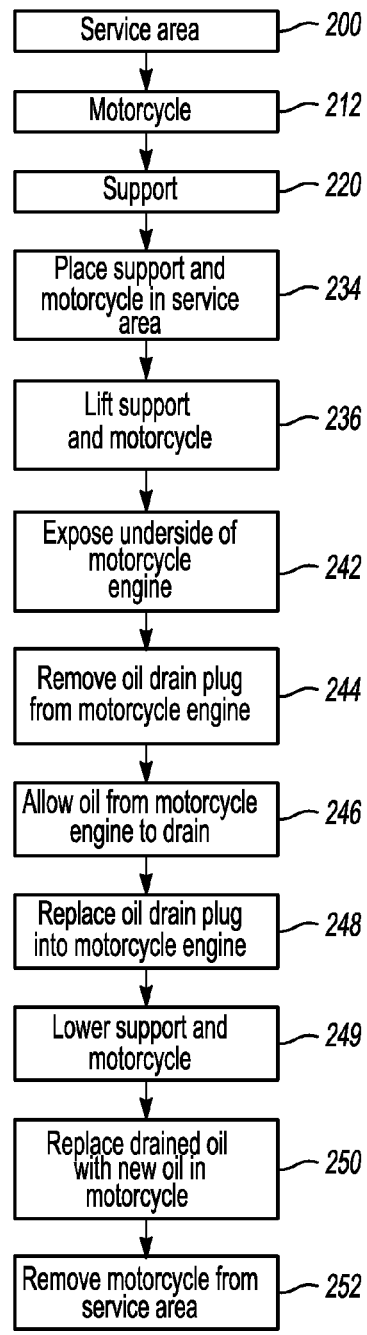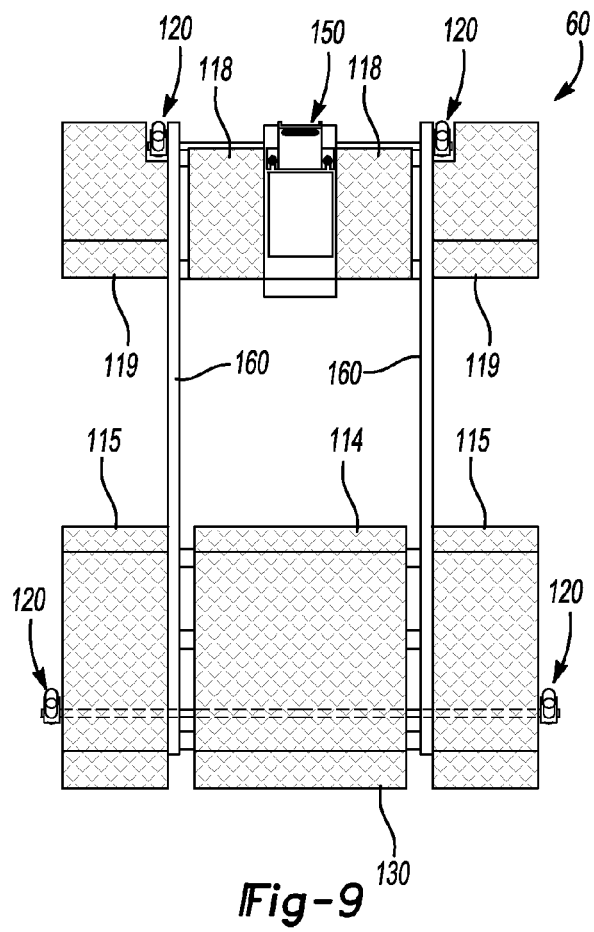
Fig-9
Fig-8

PROCESS AND STRUCTURE FOR
SERVICING A VEHICLE

CROSS-REFERENCE TO RELATED
APPLICATIONS

This application claims priority of U.S. Provisional Patent Application Ser. No. 61/950,244 filed Mar. 10, 2014, which is incorporated herein by reference.

FIELD OF THE INVENTION

This invention relates generally to servicing a non-automotive vehicle. More specifically, the invention relates to changing the oil of a non-automotive vehicle using a two-post car lift.

BACKGROUND OF THE INVENTION

Quick lube facilities, service stations, tire shops, muffler shops, etc., are well known. Such facilities allow a driver of a motor vehicle such as an automobile and/or truck to drive the vehicle into a service area and be lifted upwardly with a car lift. For example, the individual can remove the oil drain plug from the engine and allow oil to drain therefrom. After the oil has been drained, the individual can replace the oil drain plug and new oil can be placed or poured into the engine. In addition, the individual can remove the oil filter and replace it with a new oil filter and thereby provide and timely and cost efficient oil change for the driver.

Other types of motorized vehicles besides automobiles and trucks can be used by individuals for transportation, entertainment, work and the like. For example, motorcycles, scooters, all-terrain vehicles, riding lawnmowers, golf carts. 3-wheelers, and the like, hereafter referred to as non-automotive vehicles, are common and also need regular engine maintenance. In order to service the engine of such a vehicle, individuals have had to perform the work themselves or take the non-automotive vehicle to a specialty shop where work on particular types of vehicles is performed. For example, a motorcycle shop is typically where an individual will take his or her motorcycle, scooter and the like in order to have its oil changed. However, such types of facilities typically do not afford for a timely and cost efficient process for servicing such a vehicle. Therefore, a process and/or structure that would allow an individual to take a non-automotive type vehicle to a non-traditional motorcycle, golf cart. 3-wheeler, etc., facility and have the vehicle serviced would be desirable.

SUMMARY OF THE INVENTION

A support for a non-automotive vehicle, hereafter also referred to as a "vehicle", to be lifted by a two-post car lift and allow for servicing of the vehicle is disclosed. In addition, a process for servicing the vehicle is also disclosed. The support can include a support surface that has an engine access opening and a rolling mechanism attached to the support surface that affords for the support surface to roll into a service area that has a car lift. In some instances, the car lift is a two-post car lift known to those skilled in the art.

The rolling mechanism can be a plurality of wheels that are rotatably attached to the support. The support can have at least one rear ramp and at least one front ramp. The rear ramp can be part of a rear support surface and provide an inclined surface extending from a rear portion of the support surface to a floor surface. The inclined surface of the rear ramp affords for rolling the non-automotive vehicle onto the support surface.

The front ramp can be part of a front support surface. The front ramp can provide an inclined surface extending from a front surface portion of the support surface to a floor surface such that the vehicle can be rolled off of the support. The front surface can also have a wheel stop with an upright extended position and a down extended position. When in the upright extended position, the wheel stop has a generally vertical or vertically inclined surface extending upwardly from the front support and the wheel stop is operable to aid in preventing the non-automotive vehicle from rolling off of the support surface. The support can also include tie-down links that afford for tie-down straps to be used to secure the vehicle onto the support. In addition, a bracket or stand can extend from the support surface and be operable to secure the vehicle to the support, hold the vehicle on the support and the like.

The process for servicing the non-automotive vehicle can include providing a service area with a two-post car lift. A non-automotive vehicle with an engine is provided along with a support that is dimensioned to support the vehicle and to generally span across the width between two lift arms of the two-post car lift. The support can have an engine access opening that provides access to the underside of the vehicle engine. The support and the vehicle are placed within the service area between two-posts of the two-post car lift and two lift arms are placed underneath or below the support. Thereafter, the support with the vehicle is lifted upwardly such that an individual, robot, etc., can work under the vehicle and service its engine. In some instances, the engine access opening of the support is located underneath the vehicle engine and in some instances directly beneath the oil drain plug. Thereafter, the engine of the vehicle is serviced. For example, the oil drain plug of the engine is removed, the oil is drained from the engine, the oil drain plug is replaced and new oil is placed in the engine. After and/or during the vehicle being serviced, the support and the vehicle are lowered to the service area floor and the vehicle is removed from the service area.

BRIEF DESCRIPTION OF THE DRAWINGS

FIG. 5 is schematic illustration of a front view of a support according to an embodiment disclosed herein;

FIG. 6 is a schematic illustration of a bottom view of a support located on top of two lifts arms according to an embodiment disclosed herein;

FIG. 7 is schematic illustration of a process flowchart according to an embodiment disclosed herein;

FIG. 8 is schematic illustration of a process flowchart according to an embodiment disclosed herein;

FIG. 9 is a schematic illustration of a top view of a support according to another embodiment disclosed herein;

DETAILED DESCRIPTION OF THE INVENTION

Figure 1:
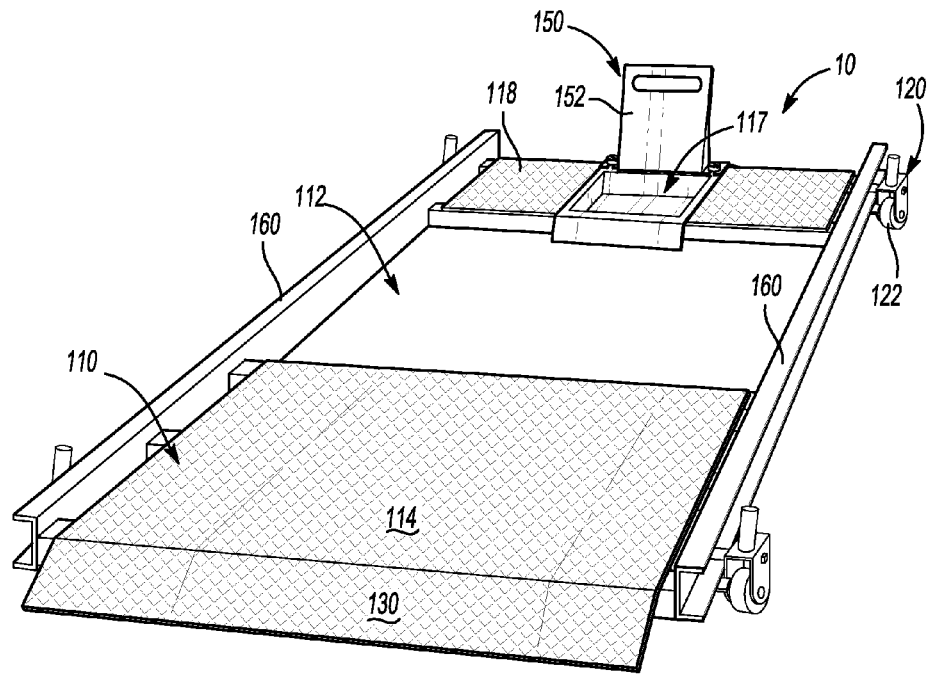
FIG. 1 is a schematic illustration of a perspective view of a support according to an embodiment disclosed herein.

The present invention discloses a structure and a process for servicing a non-automotive vehicle, hereafter also referred to as a "vehicle", in a non-traditional service area used to service the non-automotive vehicle. For example, the structure and process affords for a service area used to service automobiles and trucks to be used to efficiently and quickly service non-automotive vehicles. As such, the structure and/or the process have utility as a component and/or a process for changing the oil of a non-automotive vehicle.

For the purposes of the present invention, the term "non-automotive vehicle" includes vehicles such as motorcycles, scooters, three-wheel all-terrain vehicles, four-wheel all-terrain vehicles, six-wheel all-terrain vehicles, riding lawn-mowers, golf carts, three-wheel motor vehicles for highway transportation and the like. Also, servicing of the vehicle can include, but is not limited to, changing the oil, checking and/or adjusting the tire air pressure, performing a safety check, checking and/or replacing light bulbs and the like.

The structure, which is also referred to as a support herein, can include an engine access opening that affords for access to an underside of an engine of the vehicle and in some instances allows access to an oil drain plug, oil filter and the like of the engine. The support can also include a rolling mechanism, the rolling mechanism operable for a support surface to roll over a surface at a predetermined height. In this manner, the support surface can roll into and out of a service area and support the vehicle while it is lifted, e.g. by a two-post car lift.

At least one ramp can be attached to the support surface, the at least one ramp being a front ramp or rear ramp. The support can also include a tie-down link and/or a bracket that affords for secure holding of the non-automotive vehicle on the support while it is being serviced. The rolling mechanism can be a plurality of wheels that are rotatably attached to the support, however it is appreciated that the support can also be moved into the service area by sliding, picking the support up and placing it into service area, and the like. In addition, the rolling mechanism can have an up position that holds the support a predetermined distance above a service area floor and a down position that allows the support to rest directly onto the service area floor. The rolling mechanism can also have a lock position in which the wheels are prevented from rotating and an unlocked position in which the wheels are free to rotate.

The rear ramp can provide an inclined surface that extends from a rear portion of the support surface to a floor surface. Such an inclined surface is operable to aid in rolling the non-automotive vehicle onto the support surface. The front ramp can be part of a front surface that has a wheel stop. The wheel stop can have an upright position and a down position. In the upright position, the wheel stop provides a generally vertical surface extending upwardly from a front portion of the front support surface, the generally vertical surface operable for aiding and preventing the non-automotive vehicle from rolling off of the support surface. In the down position, the wheel stop allows for the vehicle to roll off of the support surface. In some instances, the wheel stop is detachable from the support.

The process for servicing a non-automotive vehicle in a service area can include providing a service area, a car lift within the service area, a non-automotive vehicle with an engine and a support. The support can be dimensioned to generally span across a lift arm that such that the support and a vehicle are able to be lifted by the car lift and provide easy access to an underside of the vehicle engine.

In some instances, the car lift is a two-post car lift with each post having a lift arm as is known to those skilled in the art. Also, the support can be dimensioned to generally span across the distance between the lift arms such that the support and the vehicle are able to be lifted by the two-post car lift and provide easy access to an underside of the vehicle engine.

The support also has an engine access opening that allows access to the underside of the vehicle engine. The support and the non-automotive vehicle can be placed between the two-posts of the two-post car lift and the lift arms placed under the support. Thereafter, the lift arms can be moved and raised in an upward direction and the support with the vehicle is lifted. The engine access opening of the support can be located underneath an underside of the vehicle engine and provide access to such components as the oil drain plug, oil filter and the like. After the support and the non-automotive vehicle have been lifted, the engine of the vehicle can be serviced. For example and for illustrative purposes only, an individual underneath the vehicle can remove the oil drain plug from the engine, allow at least part of any oil in the engine to be drained from the engine and then replace the oil drain plug. Thereafter, new oil can be put into the engine. It is appreciated that an oil filter of the engine can also be replaced. Thereafter, the vehicle can be lowered to the service area floor and removed from the service area. It is also appreciated that new oil can be put into the engine after the vehicle is lowered to the service area floor.

Any service area can be used, including service areas at quick lube facilities such as those used at quick lube facilities known by the names Jiffy Lube™, Victory Lane Quick Oil Change®, Valvoline Instant Oil Change, Pennzoil 10 Minute Oil Change, and services areas that are located at facilities such as muffler shops, tires stores, service stations, automotive dealerships, car washes, home garages, and the like. In addition, for the purposes of the present invention, a support can be a plate, a cart, a dolly, a platform, a hoist and combinations thereof that support and/or hold the non-automotive vehicle while it is lifted by the two-post car lift such that the vehicle can be serviced. As such, a support that is at least partially located within the service area also falls within the scope of the present invention if a non-automotive vehicle is supported and/or held by the support and the two-post car lift and the vehicle can be serviced. Thus the process includes providing any structure that is operable to hold and secure a non-automotive vehicle at least partially within a service area such that the vehicle can be at least partially serviced from underneath, the structure being held above the service area floor by mechanical means, electrical means and/or magnetic means.

Figure 2:
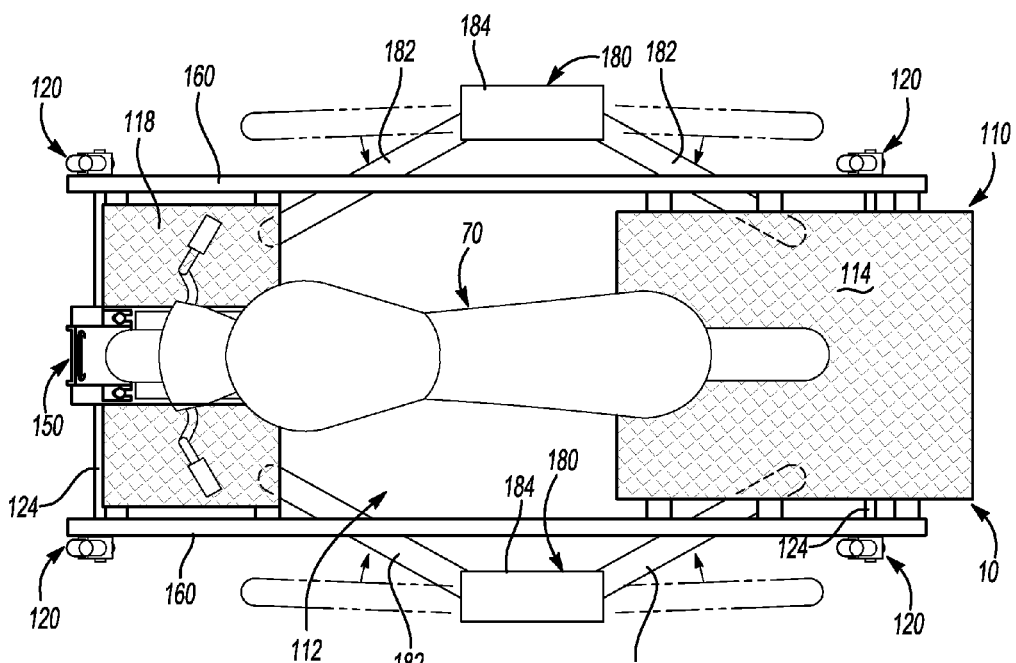
FIG. 2 is a schematic illustration of a top view of a motor cycle on a support according to an embodiment disclosed herein with the support located above two lift arms of a two-post car lift.

Turning now to FIGS. 1-6, an embodiment of a support is shown generally at reference numeral 10. The support 10 can have a non-automotive vehicle 70 thereon, with the support 10 and vehicle 70 located over a service area floor 60. It is appreciated that FIG. 2 illustrates a motorcycle for illustrative purposes only and the vehicle can be held securely on the support 10 using an attachment device such as a tie-down strap (not shown).

Figure 4:
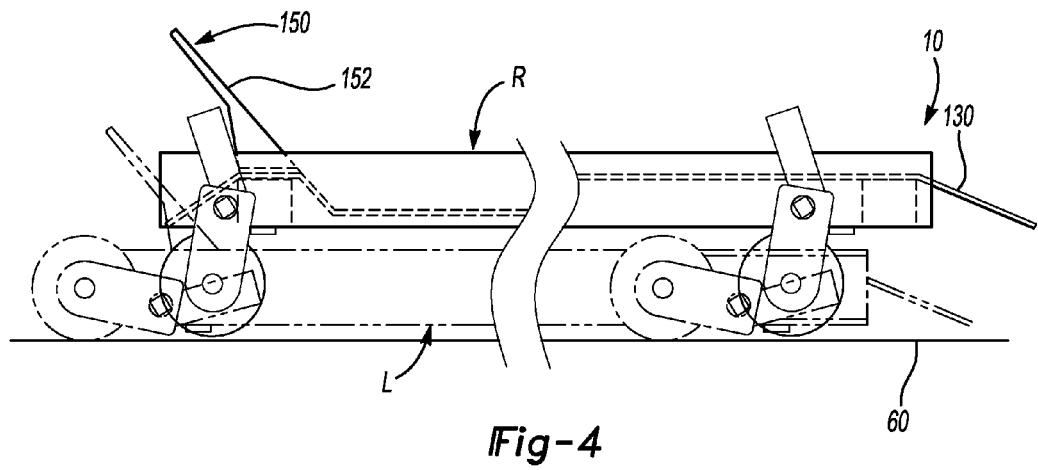
FIG. 4 is schematic illustration of a support having a down position and a raised position.

The support 10 can include a support surface 110, the support surface 100 having an engine access opening 112, a rear portion 114, and a front portion 118. Although not required, an indentation 117 can be included such that a wheel of a non-automotive vehicle can fit at least partially within and provide a location for the vehicle to be parked. In addition, more than one indentation 117 can be provided. For example, two or more indentations 117 can be provided such that wheels of a three-wheel vehicle and/or a four-wheel vehicle could fit at least partially within. The support 10 can include a rolling mechanism 120, illustratively including a plurality of wheels 122 and optional axles 124 between a pair of wheels that afford for the support 10 to roll across a surface or floor 60. The rolling mechanism is rotatably attached to the support 10 such that the support rolls across the floor 60 at a predetermined height. In addition, and as shown in FIG. 4, the rolling mechanism 120 can have a raised position R and a lowered position L. In this manner the support 10 can roll over an obstacle, lip, etc. on a service area floor when the rolling mechanism 120 is in the raised position R, and yet afford for the support 10 to rest or sit directly on the service floor, the obstacle, lip, etc. when the mechanism is in the lowered position L.

The support 10 can also include at least one ramp, for example and for illustrative purposes only a rear ramp 130. The ramp can be fixed, i.e. not movable with respect to the rear support surface 114. In the alternative, the at least one ramp can have and be movable between a retracted position and an extended position. For example, the rear ramp 130, can having a handle used to move the rear ramp from a retracted position (not shown) to an extended position. It is appreciated that the rear ramp 130 provides an inclined surface extending from the rear portion 114 of the support surface 100 to the floor surface. In this manner, the rear ramp 130 provides an aid for rolling the non-automotive vehicle up onto the support surface 110.

Figure 3:
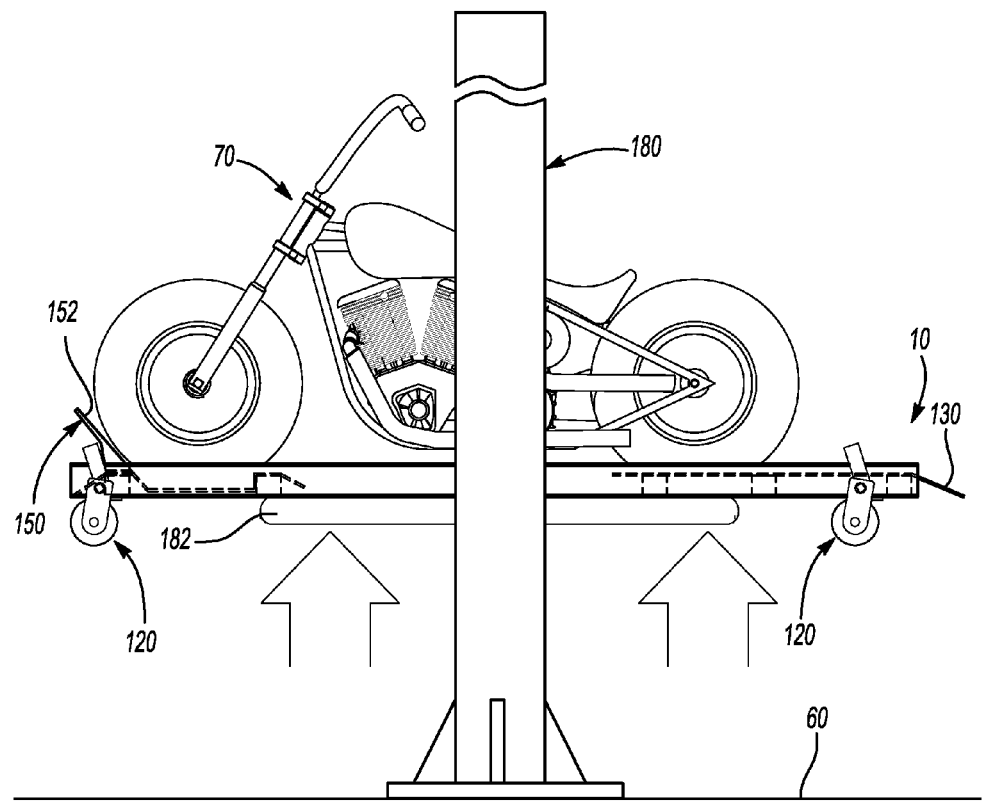
FIG. 3 is schematic illustration of a side view of the motorcycle and support shown in FIG. 2 being raised above a service area floor.

The front portion 118 can have an optional wheel stop 150 that has an upright position and a down position. In the upright position the wheel stop 150 provides a generally vertical or vertically inclined surface 152 as illustrated in FIGS. 3 and 4, the vertical surface 152 providing an aid to prevent the non-automotive vehicle 70 from rolling off of the support surface 110. In the down position, the wheel stop 150 allows the vehicle to roll off of the support 110. It is appreciated that the down position can be a removal of the wheel stop 150 from the support 10 and/or front portion 118.

The support 10 can have two main side rails or beams 160 and optional cross members or rails 162 (FIG. 6) that provide mechanical support to the rear support surface 114, front support surface 118, rolling mechanism 120 and the like. In the alternative, or in addition to, the rear support surface 114 and front support surface 118 can be used as primary cross member supports.

Turning now to FIG. 7, an embodiment for servicing a non-automotive vehicle in a service area is shown generally at reference numeral 20. The process 20 includes providing a service area with a car lift at step 200 and a non-automotive vehicle at step 210. A support is provided at step 220 and the support and vehicle are placed in the service area at step 230. It is appreciated that the vehicle can be placed on the support before the support is placed in the service area, or in the alternative, the support can be placed in the service area first, followed by the vehicle being placed onto the support. Thereafter, the support with the vehicle is lifted upwardly using the car lift at step 240, serviced at step 250, lowered at step 260 and then removed from over the service area at step 270. It is appreciated that at least part of the servicing of the vehicle can occur after the after step 260, e.g. re-filling the engine of the vehicle with oil.

Turning now to FIG. 8, another embodiment for servicing a non-automotive vehicle in a service area is shown generally at reference numeral 30. Similar to the process 20 discussed above, the process 30 includes providing a service area with a two-post car lift at step 200 and a support at step 220. However, in the process 30 a motorcycle is provided at step 212. The motorcycle and the support are placed into the service area at step 234. The motorcycle is placed on the support either before or after the support is located in the service area. The support and the motorcycle are lifted in an upward direction using the two-post car lift at step 236 such that the underside of the motorcycle engine is exposed at step 242. The oil drain plug from the motorcycle engine is removed at step 244. At step 246, the oil from the motorcycle engine is allowed to drain and the oil drain plug is replaced at step 248. The support and motorcycle are lowered to the service area floor using the two-post car lift at step 249 and new oil is placed within the motorcycle engine at step 250. Finally, the motorcycle is removed from over the service area at step 252.

Figure 10:
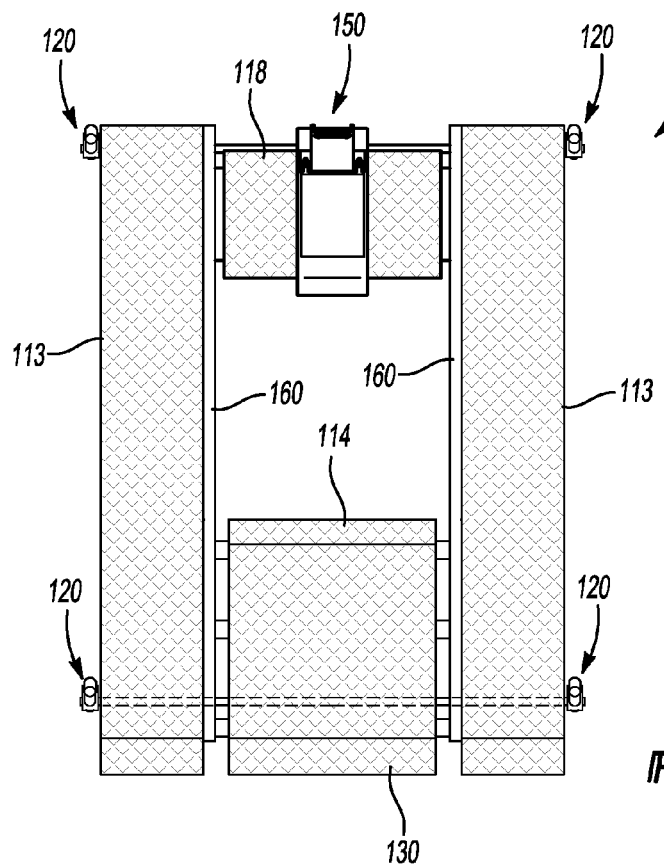
FIG. 10 is a schematic illustration of a top view of a support according to still another embodiment disclosed herein.
Figure 11:
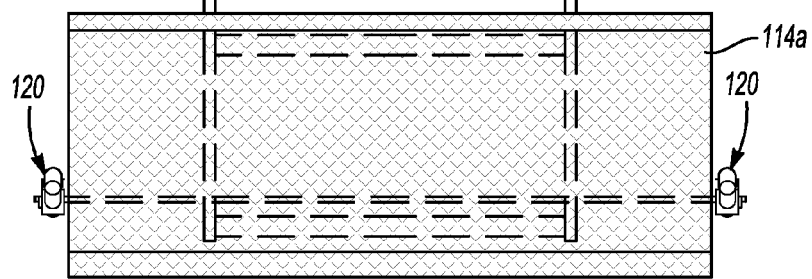
FIG. 11 is a schematic illustration of a top view of a support according to still yet another embodiment disclosed herein.

Turning now to FIGS. 9-11, other embodiments of the present invention are shown. In particular, FIG. 9 shows a support 60 having a pair of extra rear support side panels 115 and/or a pair of extra front support side panels 119. Also, FIG. 10 shows side panels 113 extending completely between the front and rear of a support 70. Finally, FIG. 11 shows a support 80 that has a one continuous wide rear support surface 114a and/or one continuous wide front support surface 118a. Also shown in FIG. 11 are cross support members 162 extending between side rails 160. It should be appreciated that the embodiments shown in FIGS. 9-11 can have the same or nearly the same type of features, support structure, etc., as shown in FIGS. 1-6 and thus the various views shown in FIGS. 1-6 provide additional support for features not explicitly shown in FIGS. 9-11.

It is also appreciated that the supports and processes illustrated in FIG. 1-11 can be used not only for motorcycles, but also scooters, three-wheel all-terrain vehicles, four-wheel all-terrain vehicles, six-wheel all-terrain vehicles, riding lawnmowers, gold carts, three-wheel motor vehicles for highway transportation such as Can-Am Spyder® type vehicles and the like.

The support can be made from any material known to those skilled in the art, illustratively including metals, plastics, rubber, wood, ceramics, and the like. The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. As such, it is the claims, and all equivalents thereof, that define the scope of the invention.

We claim:

1. A process for servicing a non-automotive vehicle in an automotive service area, the process including:
    providing an automotive service area with an automotive lift having a lift arm;
    providing a non-automotive vehicle with an engine;
    providing a support for the non-automotive vehicle, the support having a support surface with an engine access opening and a rolling mechanism attached to the support surface, the rolling mechanism operable for the support to roll within the service area;

rolling the non-automotive vehicle onto the support surface with the engine located directly above the engine access opening;
positioning the support with the non-automotive vehicle over the lift arm;
raising the lift arm and the support in a vertical direction to a predetermined height;
servicing the engine of the non-automotive vehicle through the engine access opening of the support surface.

2. The process of claim 1, wherein the automotive lift is a two-post automotive lift with two lift arms.

3. The process of claim 1, wherein the non-automotive vehicle is selected from the group consisting of a motorcycle, an all-terrain vehicle (ATV) and a street legal three-wheeler.

4. The process of claim 3, wherein the support surface has a rear ramp providing a surface that aids in rolling the non-automotive vehicle onto the support surface.

5. The process of claim 4, wherein the support surface has a wheel stop with an upright position and a down position, the wheel stop on the upright position having a vertically inclined surface extending upwardly from the support surface and operable in preventing the non-automotive vehicle from rolling off the support surface.

6. The process of claim 1, wherein servicing the engine is changing the oil of the engine by removing the oil drain plug, draining oil from the engine with the oil flowing through the engine access opening of the support surface, replacing the oil drain plug and providing additional oil into the engine.

7. The process of claim 6, further including lowering the lift arm and the support to a floor surface of the automotive service area.

8. The process of claim 7, wherein the additional oil into the engine is provided after the lift arm and the support are lowered to the automotive service area.

9. A process for servicing a non-automotive vehicle in an automotive service area, the process including:
providing an automotive service area with an automotive two-post lift having two lift arms;
providing a non-automotive vehicle with an engine;
providing a support for the non-automotive vehicle, the support having a support surface with an engine access opening and a rolling mechanism attached to the support surface, the rolling mechanism operable for the support to roll within the service area;
rolling the non-automotive vehicle onto the support surface with the engine located directly above the engine access opening;
positioning the support with the non-automotive vehicle over the two lift arms;
raising the two lift arms and the support in a vertical direction to a predetermined height;
servicing the engine of the non-automotive vehicle through the engine access opening of the support surface.

10. The process of claim 9, wherein servicing the engine is changing the oil of the engine by removing the oil drain plug, draining oil from the engine with the oil flowing through the engine access opening of the support surface, replacing the oil drain plug and providing additional oil into the engine.

11. The process of claim 10, further including lowering the two lift arms and the support to a floor surface of the automotive service area.

12. The process of claim 11, wherein the additional oil into the engine is provided after the two lift arms and the support are lowered to the automotive service area.

13. The process of claim 12, wherein the non-automotive vehicle is selected from the group consisting of a motorcycle, an all-terrain vehicle (ATV) and a street legal three-wheeler.

14. The process of claim 13, wherein the support surface has a rear ramp providing a surface that aids in rolling the non-automotive vehicle onto the support surface.

15. The process of claim 14, wherein the support surface has a wheel stop with an upright position and a down position, the wheel stop on the upright position having a vertically inclined surface extending upwardly from the support surface and operable in preventing the non-automotive vehicle from rolling off the support surface.

* * * * *